United States Patent [19]

Locatelli

[11] 4,362,832

[45] Dec. 7, 1982

[54] THERMOPLASTIC POLYMER/GLASS FIBER/BIS-MALEIMIDE MOLDING COMPOSITIONS

[75] Inventor: Jean-Louis Locatelli, Vienne, France

[73] Assignee: Rhone-Poulenc Industries, Paris, France

[21] Appl. No.: 268,152

[22] Filed: May 29, 1981

Related U.S. Application Data

[63] Continuation of Ser. No. 72,622, Sep. 5, 1979, abandoned.

[30] Foreign Application Priority Data

Sep. 5, 1978 [FR] France ............................... 78 25592

[51] Int. Cl.$^3$ ...................... C08L 25/12; C08L 67/02; C08L 77/06
[52] U.S. Cl. ................................ 524/102; 524/105; 524/566; 524/577; 524/605; 524/606
[58] Field of Search ........... 260/40 R, 37 PC, 45.8 N, 260/42.18, 37 N; 525/6; 524/102, 105, 605, 606, 566, 577

[56] References Cited

U.S. PATENT DOCUMENTS

| | | | |
|---|---|---|---|
| 3,472,729 | 10/1969 | Sterman et al. | 260/42.18 |
| 3,853,808 | 12/1974 | Kishikawa et al. | 260/42.18 |
| 4,125,514 | 11/1978 | Stabler | 260/42.15 |
| 4,224,216 | 9/1980 | Locatelli et al. | 260/37 N |

*Primary Examiner*—Lewis T. Jacobs
*Attorney, Agent, or Firm*—Burns, Doane, Swecker & Mathis

[57] ABSTRACT

A molding composition is comprised of (i) a thermoplastic polymer, (ii) glass fibers and (iii) a bis-maleimide, and is useful for the fabrication of a variety of shaped articles, especially for the automotive industry [e.g., radiators, battery casings, fans, etc.].

10 Claims, No Drawings

THERMOPLASTIC POLYMER/GLASS FIBER/BIS-MALEIMIDE MOLDING COMPOSITIONS

This application is a continuation of application Ser. No. 72,622, filed Sept. 5, 1979 abandoned.

CROSS-REFERENCE TO RELATED APPLICATIONS

[1] Locatelli and Macabrey copending application, Ser. No. 961,769, filed Nov. 17, 1979, and assigned to the assignee hereof; and

[2] Locatelli and Macabrey copending application, Ser. No. 961,770, filed Nov. 17, 1979, also assigned to the assignee hereof.

BACKGROUND OF THE INVENTION

The present invention relates to novel molding compositions comprising a thermoplastic polymer, glass fibers and a bis-maleimide.

SUMMARY OF THE INVENTION

This invention features novel molding compositions comprising:
(i) a thermoplastic polymer selected from the group consisting of a styrene polymer, polyethylene, polyethylene terephthalate and nylon-6;
(ii) glass fibers; and
(iii) a bis-maleimide.

DETAILED DESCRIPTION OF THE INVENTION

More particularly according to the invention, the respective amounts of the several components of the subject compositions are preferably from 1 to 50% by weight, and more preferably from 10 to 40% by weight of the glass fibers (ii) based upon the total weight of the thermoplastic polymer (i) and said glass fibers (ii), and from 0.01 to 10% by weight, more preferably from 0.1 to 5% by weight of the bis-maleimide (iii), also based upon the total weight of the thermoplastic polymer (i) and the glass fibers (ii).

By the expression "styrene polymer" as utilized herein, there are intended styrene homopolymers, as well as copolymers of styrene with acrylonitrile comonomer, and acrylonitrile/butadiene/styrene terpolymers.

The preparations of the various thermoplastic polymers which can be included in the subject compositions are per se well known to the art and are not themselves specific objects of the invention. Preferably, polymers having the following characteristics are utilized:

[a] polystyrene having an average molecular weight between 70,000 and 700,000;

[b] styrene/acrylonitrile copolymers, wherein the ratio of $$\frac{\text{number of units derived from styrene}}{\text{number of units derived from acrylonitrile}}$$

is between 1/1 and 6/1, said copolymers having an average molecular weight of 70,000 to 700,000;

[c] acrylonitrile/butadiene/styrene terpolymers comprising 4 to 20% by weight butadiene units, with the ratio of the units derived from styrene and from acrylonitrile being between 1/1 and 6/1 (as in the abovementioned copolymers), said terpolymers having an average molecular weight of 70,000 to 700,000;

[d] polyethylene terephthalate having an average molecular weight of 15,000 to 100,000;

[e] nylon-6 (poly-caprolactam), having an average molecular weight between 15,000 and 50,000; and

[f] high or low density polyethylene having a specific viscosity between 0.2 and 0.7 (measured, at 130° C. in a 0.2% tetralin solution).

The bis-maleimide preferably has the structural formula:

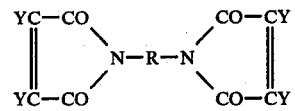

wherein Y is H, CH₃ or Cl, and R is selected from the group consisting of:
(a) a linear or branched chain alkylene radical containing up to 12 carbon atoms;
(b) a cyclohexylene or cyclopentylene radical;
(c) a phenylene or naphthylene radical;
(d) a member selected from the group consisting of:

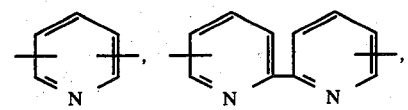

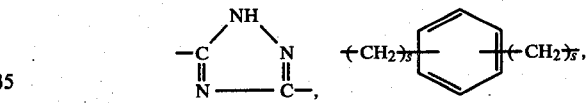

wherein s is equal to 1, 2 or 3; and
(e) a radical comprising two phenylene radicals linked together by a simple valence bond or by a hetero atom or inert group, particularly —CH₂, —O—, —C(CH₃)₂—, —SO₂—, —S—.

As specific examples of such bis-maleimides, the following are noted as illustrative:

N,N'-ethylene-bis-maleimide;
N,N'-cyclohexylene-bis-maleimide;
N,N'-metaphenylene-bis-maleimide;
N,N'-paraphenylmethane-bis-maleimide;
N,N',4,4'-diphenylmethane-bis-maleimide;
N,N',4,4',-diphenylether-bis-maleimide;
N,N',4,4'-diphenylsulfone-bis-maleimide; and
N,N',4,4'-diphenylmethane-bis-chloromaleimide.

These bis-imides may be prepared according to the methods described, for example, in U.S. Pat. No. 3,018,290 or British patent specification No. 1,137,592.

The glass fibers preferably have lengths between 100 and 12 mm, the diameters of the individual fibers generally being between 2 and 20μ. Preference is given to fibers of Type E [as defined in "Handbook of Reinforced Plastics"—Ed. 1964, p. 120], whereby their gauge (weight per kilometer of filament) may vary between 600 and 2500 dtex. Although the fibers of the E type are considered particularly suitable for the intended applications of the compositions of the invention, other fibers may also be used, either exclusively or in combination with E type fibers. The aforesaid text indicates (pages 121–122) examples of such fibers, and same is hereby expressly incorporated by reference.

Generally, the fibers used in the invention are treated fibers. On the one hand, the fibers may be bundled by means of a binder. As examples of such binders, polyvinyl acetate, copolymers of ethylene and acrylic esters, epoxy resins, polyethers and aromatic polyesters, are mentioned.

On the other hand, the fibers may be treated with a sizing or complexing agent, such as, for example, organosilicon compounds, such as vinyl-tri(ethoxymethoxy)silane, γ-aminopropyltriethoxysilane, [(amino-2-ethylamino)-3-propyl] trimethoxysilane, vinyl(methacryloyl)trimethoxysilane, or compounds such as the complexes of chromium with methacrylic acid.

It should also be understood that the compositions are defined by their essential components, but it is also within the scope of the invention to incorporate certain additives, such as, for example, fillers and powders (talc, mica, lithopone, calcined silica, carbon fibers, asbestos fibers, quartz fibers, ceramic fibers, other mineral fibers), pigments, lubricants, flame retardants, stabilizers, etc.

The compositions according to the invention may also include a catalyst, advantageously a peroxide or suitable sulfur catalyst. Preferably, the catalyst is a sulfur catalyst selected from the group consisting of the thiuram sulfides and the mercaptothiazoles, such as disclosed in copending application, Ser. No. 961,769, filed Nov. 17, 1978, and hereby expressly incorporated by reference; most preferred is the catalyst dibenzothiazyl disulfide.

Elastic modulus and impact resistance modifiers are also envisaged as appropriate additives, e.g., ethylene based elastomeric copolymers including at least one other olefinic comonomer, said copolymer having an essentially amorphous structure (degree of crystallinity being less than 15%) and a Mooney ML-4 NF standard T 43005 viscosity between 20 and 120 at 121° C. See copending application Ser. No. 961,770, filed Nov. 17, 1978, also expressly incorporated by reference.

The compositions according to the invention may be formulated by the simple mixing of the several components. According to a preferred method, the operation is performed in two stages: first, the thermoplastic polymer, the bis-maleimide and optionally the catalyst are mixed together; then, following homogenization of the mixture, the glass fibers are introduced while continuing the homogenization operation. The aforesaid operations are typically performed at ambient temperature (15° to 30° C.). The composition prepared in this manner may subsequently by directly molded by compression at a temperature between 160° and 280° C. under a pressure of 100 to 400 bars, or same may be extruded at a temperature between 160° and 280° C., then granulated and molded by compression or injection molding at a temperature of from 160° to 280° C. and under a pressure between 100 and 1500 bars. The second method is usually employed because of ease of operation.

The compositions according to the invention are particularly suitable for the manufacture of items used in the automotive industry (radiators, battery casings, fans), and for the manufacture of machining blanks replacing light alloys.

The articles prepared from compositions according to the invention possess a plurality of interesting properties. They are particularly remarkable with respect to bending strength and impact strength; the methods utilized in determining such properties being set forth hereinbelow.

In order to further illustrate the present invention and the advantages thereof, the following specific examples are given, it being understood that same are intended only as illustrative and in nowise limitative.

EXAMPLE 1

On a roll mixer, a mixture consisting of 69 parts (by weight) of polystyrene powder and 1 part of N,N',4,4'-diphenylmethane-bis-maleimide was homogenized for 15 minutes at 25° C. The polystyrene had an average molecular weight of 230,000. Subsequently, 30 parts of glass fibers were introduced into the mixture. These glass fibers, having an average length of 6 mm, were bonded by means of an aromatic polyether and treated (coupling agent) with γ-aminopropyltriethoxysilane. Homogenization on the rollers was continued for another minute.

The mixture was then introduced into a single screw extruder having the following characteristics: length of screw, 400 mm; screw diameter, 20 mm; compression ratio, 3.5; die diameter, 3 mm. The extrusion was effected at a temperature gradient of 180°-200°-180° C. (die). The extrudate was next granulated. The granules were injection molded at 180° C. under a pressure of 300 bars.

The characteristic properties of the resultant shaped articles were determined and are reported in the Table following Example 8.

EXAMPLE 2

The experiment of Example 1 was repeated, but using 67 parts of the polystyrene and 3 parts of the same bis-maleimide.

EXAMPLES 3 AND 4

The experiments of Examples 1 and 2 were repeated, but using nylon-6 in place of the polystyrene [respectively, 69 parts polyamide/1 part bis-maleimide (Example 3) and 67 parts polyamide/3 parts bis-maleimide (Example 4)].

The nylon-6 had an average numerical molecular weight of 25,000.

The conditions of transformation (extrusion temperature, temperature and pressure of injection) are also shown in the Table.

EXAMPLES 5 AND 6

The experiments of Examples 1 and 2 were repeated, but using, in place of the polystyrene, an identical amount of polyethylene terephthalate.

The polyester had an average molecular weight of 30,000.

The conditions of transformation too are shown in the Table.

EXAMPLES 7 AND 8

The experiments of Examples 1 and 2 were repeated, but using, in place of the polystyrene, an identical amount of polyethylene.

This low density polyethylene had a specific viscosity of 0.24 (measured at 130° in a 0.2% tetralin solution).

The transformation conditions are also shown in the Table.

Also in the table, for purposes of comparison, corresponding values obtained for shaped articles prepared from compositions comprising only the thermoplastic polymer and the glass fibers, are reported.

TABLE

| Example No. | Control | 1 | 2 | Control | 3 | 4 |
|---|---|---|---|---|---|---|
| Type of Polymer | Polystyrene | | | Nylon-6 | | |
| Amount of Bis-maleimide (in %) | 0 | 1 | 3 | 0 | 1 | 3 |
| Properties | | | | | | |
| Bending Strength at 25° C. kg/mm² (a) | 11.9 | 15.1 | 14.7 | 20.7 | 22.4 | 21.4 |
| Elastic Modulus at 25° C. kg/mm² (b) | 431.6 | 534.5 | 507.5 | 490.2 | 461.9 | 435.6 |
| Impact Strength at 25° C. kg cm/cm³ | 7.5 | 10.7 | 12.0 | 35.8 | 42.5 | 41.8 |
| Operating Conditions | | | | | | |
| t °C. extrusion | | 180 - 200 - 180 | | | 240 - 260 - 235 | |
| t °C. injection/pressure | | 180° C./300 bars | | | 240° C./300 bars | |

| Example No. | Control | 5 | 6 | Control | 7 | 8 |
|---|---|---|---|---|---|---|
| Type of Polymer | Polyester 2 GT | | | Polyethylene | | |
| Amount of Bis-maleimide (in %) | 0 | 1 | 3 | 0 | 1 | 3 |
| Properties | | | | | | |
| Bending Strength at 25° C. kg/mm² (a) | 6.5 | 8.4 | 7.4 | 10.3 | 12.0 | 11.9 |
| Elastic Modulus at 25° C. kg/mm² (b) | 435.6 | 514.9 | 513.5 | 293.1 | 264.4 | 260.9 |
| Impact Strength at 25° C. kg cm/cm³ | 4.35 | 5.15 | 4.5 | 11.7 | 22.7 | 17.9 |
| Operating Conditions | | | | | | |
| t °C. extrusion | | 240 - 260 - 255 | | | 175 - 190 - 180 | |
| t °C. injection/pressure | | 240° C./300 bars | | | 210° C./300 bars | |

(a) ASTM Standard D 790-63
(b) ASTM Standard D 790-63 (distance between supports: 25.4 mm)
(c) NF T 51017 Standard (Izod impact strength - unnotched specimen)

While the invention has now been described in terms of various preferred embodiments and illustrated with respect to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A composition of matter comprising (i) a thermoplastic polymer selected from the group consisting of a styrene polymer, nylon-6 and polyethylene terephthalate; (ii) glass fibers in an amount ranging from 1 to 50% by weight based upon the total weight of the thermoplastic polymer and said glass fiber; and (iii) a bis-maleimide in an amount ranging from 0.01 to 10% by weight of the thermoplastic polymer and the glass fibers.

2. The composition of matter as defined by claim 1, the amount of glass fibers (ii) ranging from 10 to 40% by weight, and the amount of bis-maleimide (iii) ranging from 0.1 to 5% by weight.

3. The composition of matter as defined by claim 1, the thermoplastic polymer being selected from the group consisting of styrene homopolymer, styrene/acrylonitrile copolymer, and acrylonitrile/butadiene/styrene terpolymer, said thermoplastic polymer having a molecular weight of from 70,000 to 700,000.

4. The composition of matter as defined by claim 1, the thermoplastic polymer being polyethylene terephthalate having a molecular weight of from 15,000 to 100,000.

5. The composition of matter as defined by claim 1, the thermoplastic polymer being nylon-6 having a molecular weight of from 15,000 to 50,000.

6. The composition of matter as defined by claim 1, the bis-maleimide having the structural formula:

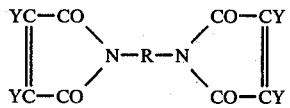

wherein Y is independently selected from the group consisting of H, $CH_3$ and Cl, and R is selected from the group consisting of a linear or branched chain alkylene radical containing up to 12 carbon atoms; cyclohexylene; cyclopentylene; phenylene; naphthylene; a member selected from the group consisting of

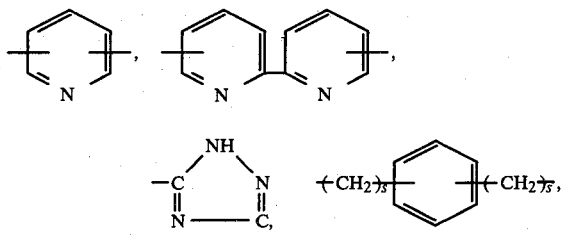

wherein s is equal to 1, 2 or 3; and a member comprising two phenylene radicals linked together by a member selected from the group consisting of a valence bond, $-CH_2-$, $-O-$, $-C(CH_3)_2-$, $-SO_2-$ and $-S-$.

7. The composition of matter as defined by claim 6, wherein the bis-maleimide is selected from the group consisting of N,N'-ethylene-bis-maleimide; N,N'-metaphenylene-bis-maleimide; N,N'-paraphenylene-bis-maleimide; N,N',4,4'-diphenylmethane-bis-maleimide; N,N',4,4'-diphenylether-bis-maleimide; N,N',4,4'-diphenylsulfone-bis-maleimide; N,N'',4,4'-diphenylmethane-bis-tetrahydrophthalimide; and N,N',4,4'-diphenylmethane-bis-chloromaleimide.

8. The composition of matter as defined by claim 1, further comprising a curing catalyst.

9. A shaped article comprising the composition of matter as defined by claim 1.

10. A molded shaped article comprising the composition of matter as defined by claim 1.

* * * * *